(12) United States Patent
Muranaka (10) Patent No.: US 6,624,205 B2
(45) Date of Patent: Sep. 23, 2003

(54) CATION EXCHANGER, PROCESS FOR PRODUCING SAME, AND ITS USE

(75) Inventor: Kazuaki Muranaka, Shinnanyo (JP)

(73) Assignee: Tosoh Corporation, Yamaguchi (JP)

( * ) Notice: Subject to any disclaimer, the term of this patent is extended or adjusted under 35 U.S.C. 154(b) by 0 days.

(21) Appl. No.: 10/055,921

(22) Filed: Jan. 28, 2002

(65) Prior Publication Data

US 2002/0103265 A1 Aug. 1, 2002

(30) Foreign Application Priority Data

Jan. 29, 2001 (JP) ......................................... 2001-20232
Jan. 29, 2001 (JP) ......................................... 2001-20233

(51) Int. Cl.$^7$ ................................................ C08J 5/20
(52) U.S. Cl. ........................................................ 521/25
(58) Field of Search ............................ 252/184; 521/25

(56) References Cited

U.S. PATENT DOCUMENTS

| 3,083,118 | A | | 3/1963 | Bridgeford |
| 3,723,306 | A | | 3/1973 | Bridgeford |
| 3,991,018 | A | * | 11/1976 | Strop et al. ............... 260/2.2 R |
| 4,100,149 | A | | 7/1978 | Meiller et al. |
| 4,337,185 | A | | 6/1982 | Wessling et al. |
| 4,859,462 | A | | 8/1989 | Chow et al. |
| 5,030,352 | A | | 7/1991 | Varady et al. |
| 5,648,400 | A | | 7/1997 | Sugo et al. |

FOREIGN PATENT DOCUMENTS

| DE | 30 07 869 A1 | 11/1980 |
| WO | WO 92/11933 | 7/1992 |

OTHER PUBLICATIONS

Tsuneda, S. et al., "Protein Adsorption Characteristics of Porous and Tentacle Anion–Exchange Membrane Prepared by Radiation–Induced Graft Polymerization", Radiat. Phys. Chem. vol. 46, No. 2, 1995, pp. 239–245.

Sasagawa, N. et al., "Ionic Crosslinking of $SO_3H$–Group–Containing Graft Chains Helps to Capture Lysozyme in a Permeation Mode"; Journal of Chromatography A, 848, 1999, pp. 161–168.

Ito, Y. et al., "Oxidoreduction–Sensitive Control of Water Permeation Through a Polymer Brushes–Grafted Porous Membrane", Macromolecules, vol. 30, No. 19, 1997, pp. 5856–5859.

European Search Report.

* cited by examiner

Primary Examiner—Mukund J. Shah
Assistant Examiner—Zachary C. Tucker
(74) Attorney, Agent, or Firm—Sughrue Mion, PLLC (57) ABSTRACT

A cation exchanger comprised of a fine particle having bound to the surface thereof a polymer having a cation exchanging property, wherein said polymer is selected from (i) polymers prepared by polymerization of an unsaturated carboxylic acid and partially crosslinked with a polymer having a functional group capable of reacting with a carboxylic acid, and (ii) an acrylic acid-maleic acid copolymer. The cation exchanger is produced by the steps of: dispersing fine particles in a solution containing (i) a combination of a polymer prepared by polymerization of an unsaturated carboxylic acid, with a polymer having a functional group capable of reacting with a carboxylic acid, or (ii) an acrylic acid-maleic acid copolymer, to prepare a dispersion of fine particles; removing a liquid medium from the particle dispersion to separate a solid content; and then, heating the solid content in a dried state. The cation exchanger is useful as a packing for chromatography.

7 Claims, 3 Drawing Sheets

FIG. 3 to be analyzed or separated or isolated, and to
provide a column for chromatography packed with the
packing comprised of the cation exchanger.
CATION EXCHANGER, PROCESS FOR PRODUCING SAME, AND ITS USE

BACKGROUND OF THE INVENTION (1) Field of the Invention

This invention relates to a cation exchanger, a process for producing the cation exchanger, and a packing for chromatography comprised of the cation exchanger.

(2) Description of the Related Art

Fine particles having a cation exchanging group are widely used in the field of liquid chromatography for analyzing or separating or isolating, for example, amino acids, peptide, protein, nucleic acids and saccharides.

Cation exchangers are usually made by introducing a cation exchanging group in fine particles by allowing the cation exchanging group to directly react with a functional group present on the surface of the fine particles. Specific examples of the method of introducing a cation exchanging group in fine particles, there can be mentioned a method of introducing a carboxylic acid by allowing, for example, chloroacetic acid to react with a hydroxyl group present on the surface of fine particles; and a method of introducing an allyl group or an epoxy group to a hydroxyl group present on a fine particle surface and then sulfonating the introduced group.

The cation exchanging group is introduced onto the surface of fine particles. When the fine particles used are porous, the cation exchanging group is introduced onto the inner wall of pores as well as the particle surfaces. Therefore, the amount of a sample to be analyzed or separated which is capable of being retained on the fine particle surfaces is determined principally on the surface area of the fine particles or on both of the surface area thereof and the pore diameter. The cation exchanger adsorbs or retains a sample to be analyzed or separated in a single layer form on fine particle surface. Therefore, when the cation exchanger is used for liquid chromatography, it rapidly absorbs or desorbs the sample and gives a sharp separation pattern.

In recent years, in order to enhance the rate of operation for separation of protein or other sample materials to be adsorbed, a cation exchanger having an improved capacity for adsorption of protein or the other materials is being developed. Attempts are being made for enhancing the adsorption capacity of fine particles. For example, a process for producing a cation exchanger capable of adsorbing a sample to form multi-layers of the sample on the fine particle surface by introducing a polymer chain having an ion exchanging group onto the fine particle surface has been proposed in U.S. Pat. No. 5,453,186. As the method of introducing the polymer chain having an ion exchanging group onto a fine particle surface, many proposals have been made, for example, in U.S. Pat. Nos. 3,723,306, ibid. 4,137,137, ibid. 4,298,698, ibid. 4,605,685, and ibid. 4,728,678. The proposed methods include (i) a method of graft polymerization, namely, irradiating a fine particle surface with radiation to form radical initiating sites, or treating a fine particle surface with a cerium salt or a manganese salt to form hydroxyl groups as radical initiating sites, and then, allowing a polymer chain to grow on each radical initiating site; (ii) a method of introducing an unsaturated group onto a fine particle surface and then treating the unsaturated group-introduced fine particle in a monomer solution whereby a polymer chain derived from the monomer is allowed to grow on the unsaturated group; and (iii) a method of introducing a functional group to a polymer terminal and then the polymer is allowed to react with a functional group present on a fine particle surface.

The cation exchangers produced by the above-proposed processes exhibit enhanced capacity for adsorbing an objective sample and, when the cation exchanger is used for separation of an objective sample, the operation can be carried out at a high rate. However, these cation exchangers have straight-chain polymers introduced onto the fine particle surfaces thereof, and therefore, when it is used as being packed in a column for liquid chromatography, a high operation pressure is required for feeding a liquid. Thus, pressure-resistant equipment and pipes must be used for liquid chromatography means spanning from a liquid-feed pump to a detector and for paths of flow connecting these means each other. Consequently problems arise in that the equipment cost increases, a sealing material is readily deteriorated and parts must be exchanged with a shortened interval of time, and further, liquid leakage tends to occur. Occasionally the cation exchangers are broken by the high pressure.

The liquid flow characteristics are closely related with the particle diameter of cation exchangers. If the particle diameter of cation exchangers is enlarged, the liquid passage characteristics can be improved, but, the separation capacity of cation exchangers as used for liquid chromatography is lowered. To sum up, the cation exchangers produced by the above-proposed processes cannot be advantageously employed for liquid chromatography for which a high adsorption capacity and a high separation capacity are required.

Another proposal has been made to improve the liquid passage characteristics by crosslinking polymer chains introduced onto the fine particle surface (for example, U.S. Pat. Nos. 4,100,149 and ibid. 4,376,047). However, it has not been reported in these patent publications whether the produced cation exchangers exhibit or do not exhibit enhanced capacity for adsorption of an objective sample to be analyzed or separated or isolated. It is presumed that a coating film layer (ion exchanging layer) comprised of the crosslinked polymer chains and formed on the fine particle surface is shrunk with the result of reduction of the adsorption capacity of an objective sample.

SUMMARY OF THE INVENTION

In view of the foregoing, an object of the present invention is to provide a cation exchanger comprised of a fine particle, which has an enhanced capacity for adsorption of a sample to be analyzed, separated or isolated, and exhibits improved liquid passage characteristics.

Another object of the present invention is to provide a process for producing a cation exchanger comprised of a fine particle, which exhibits an enhanced capacity for adsorption of a sample to be analyzed, separated or isolated and exhibits improved liquid passage characteristics.

Other objects of the present invention are to provide a packing for chromatography comprised of a cation exchanger exhibiting an enhanced capacity for adsorption of a sample to be analyzed, separated or isolated, and to provide a column for chromatography packed with the packing comprised of the cation exchanger.

In one aspect of the present invention, there is provided a cation exchanger comprised of a fine particle having bound to the surface thereof a polymer having a cation exchanging property, characterized in that said polymer having a cation exchanging property is at least one polymer selected from (i)

polymers prepared by polymerization of at least one kind of unsaturated carboxylic acid and partially crosslinked with a polymer having a functional group capable of reacting with a carboxylic acid, and (ii) acrylic acid-maleic acid copolymers.

The polymers (i) are preferably copolymers prepared by copolymerization of at least one kind of unsaturated carboxylic acid selected from acrylic acid, methacrylic acid, maleic acid and itaconic acid with at least one kind of monomer selected from vinylsulfonic acid, 3-sulfopropyl acrylate, 3-sulfopropyl methacrylate, 3-sulfo-2-hydroxypropyl acrylate and 3-sulfo-2-hydroxypropyl methacrylate.

The polymer having a functional group capable of reacting with a carboxylic acid for partially crosslinking the polymer (i) preferably has at least one kind of functional group selected from a hydroxyl group, a glycidyl group and an amino group as the functional group capable of reacting with a carboxylic acid. The polymer having a hydroxyl group as the functional group capable of reacting with a carboxylic acid is preferably selected from polyvinyl alcohol and polysaccharides, and the polymer having an amino group as the functional group capable of reacting with a carboxylic acid is preferably polyethyleneimine.

The acrylic acid-maleic acid copolymers (ii) preferably have a weight average molecular weight of at least 10,000 and are bound to the fine particles through a single bond.

In another aspect of the present invention, there is provided a process for producing the above-mentioned cation exchanger, which comprises the steps oft dispersing fine particles in (i) a solution containing a combination of at least one polymer selected from polymers prepared by polymerization of at least one kind of unsaturated carboxylic acid, with a polymer having a functional group capable of reacting with a carboxylic acid, or (ii) a solution containing at least one acrylic acid-maleic acid copolymer, to prepare a dispersion of fine particles; removing a liquid medium from the dispersion of fine particles to separate a solid content; and then, heating the separated solid content in a dried state to obtain a fine particle having bound to the surface thereof a polymer having a cation exchanging property.

The fine particles preferably have at least one kind of functional group selected from a hydroxyl group, a glycidyl group and an amino group.

In a still another aspect of the present invention, there is provided a packing for chromatography, which is comprised of the above-mentioned cation exchanger.

In a further aspect of the present invention, there is provided a column for chromatography, which is packed with the above-mentioned packing.

PREFERRED EMBODIMENTS OF THE INVENTION

The anion exchanger of the present invention is comprised of a fine particle having bound to the surface thereof a polymer having a cation exchanging property. The polymer having a cation exchanging property is characterized as being selected from (i) polymers (hereinafter referred to as "unsaturated carboxylic acid polymers" when appropriate) prepared by polymerization of at least one kind of unsaturated carboxylic acid and partially crosslinked with a polymer having a functional group capable of reacting with a carboxylic acid, and (ii) acrylic acid-maleic acid copolymers. Due to this structural feature including a combination of a fine particle with a surface layer of the specified cation exchanging polymer, the cation exchanger of the present invention exhibits an enhanced capacity for adsorption of a sample to be analyzed or separated and improved liquid passage characteristics. Consequently, if the fine particle diameter is reduced, a high separation performance can be retained. Further, although the capacity for adsorption of a sample to be analyzed or separated is high, ion exchange can be carried out at a high rate.

The size of a fine particle constituting the cation exchanger of the present invention is not particularly limited, but the fine particle usually has an average particle diameter in the range of 1 $\mu$m to 1,000 $\mu$m, preferably 1 $\mu$m to 100 $\mu$m to obtain good separation performance when it is used for liquid chromatography. The fine particle may be either a porous particle having pores on the surface thereof, or a non-porous particle having no pore.

The fine particles used include organic fine particles and inorganic fine particles. The fine particles are selected from those which have good heat resistance sufficient for withstanding the heat-treatment carried out in the production process. The organic fine particles include, for examples those of copolymers of a monofunctional vinyl monomer with a polyfunctional vinyl monomer, and crosslinked polysaccharides. As specific examples of the monofunctional vinyl monomer, there can be mentioned hydroxyalkyl asters of acrylic acid and methacrylic acid, such as 2-hydroxyethyl acrylate, 2,3-dihydroxypropyl acrylate, 2-hydroxyethyl methacrylate and 2,3-dihydroxypropyl methacrylate; epoxy group-containing esters of acrylic acid and methacrylic acid, such as glycidyl acrylate and glycidyl methacrylate; acrylic acid and methacrylic acid: alkyl acrylates and alkyl methacrylates, such as methyl acrylate, ethyl acrylate, methyl methacrylate and ethyl methacrylate; styrene derivatives such as vinylbenzyl alacohol, vinylbenzyl glycidyl ether and hydroxystyrene; and vinyl acetate. As specific examples of the polyfunctional vinyl monomer, there can be mentioned polyol esters of acrylic acid and methacrylic acid, such as ethylene glycol diacrylate, glycerol diacrylate, ethylene glycol dimethacrylate and glycerol dimethacrylate; and divinylbenzene and triallyl isocyanurate. As specific examples of the crosslinked polysaccharides, there can be mentioned cellulose, agarose, dextran and mannose.

As specific examples of the inorganic fine particles, there can be mentioned silica, zeolite and titania.

When the polymer having a cation exchanging property to be bound to the fine particle surface is an unsaturated carboxylic acid polymer partially crosslinked with a polymer having a functional group capable of reacting with a carboxylic acid, the fine particle preferably has a functional group capable of reacting with a carboxylic acid because the cation exchanger has good durability when used as a packing for liquid chromatography, although the fine particle used is not limited thereto. When the polymer having a cation exchanging property is an acrylic acid-maleic acid copolymer, the fine particle preferably has on the surface thereof at least one kind of functional group capable of being condensed with carboxylic acid, such as a hydroxyl group, a glycidyl group or an amino group.

As examples of the unsaturated carboxylic acid polymer partially crosslinked with a polymer having a functional group capable of reacting with a carboxylic acid, there can be mentioned those which have at least one kind of structural units derived from acrylic acid, methacrylic acid, itaconic acid, maleic acid and cinnamic acid. The amount of the unsaturated carboxylic acid polymer partially crosslinked with a polymer having a functional group capable of reacting with a carboxylic acid is preferably in the range of 0.05 to 0.3 part by weight based on one part by weight of a fine particle.

The acrylic acid-maleic acid copolymer preferably has a weight average molecular weight of at least 10,000 in view of high capacity for adsorption Of a sample to be analyzed or separated. The amount of the acrylic acid-maleic acid copolymer is preferably in the range of 0.05 to 0.3 part by weight based on one part by weight of a fine particle.

The unsaturated carboxylic acid polymer having a cation exchanging property to be bound to the fine particle surface preferably includes, for example, sulfonic acid type copolymers which are prepared by copolymerization of at least one unsaturated carboxylic acid, such as recited above, with at least one sulfonic acid group-containing vinyl monomer. As specific examples of the sulfonic acid group-containing vinyl monomer, there can be mentioned 3-sulfopropyl acrylate, 3-sulfo-2-hydroxypropyl acrylate, 3-sulfopropyl methacrylate, 3-sulfo-2-hydroxypropyl methacrylate, 3-sulfopropyl acrylamide, 3-sulfopropyl methacrylamide and vinylsulfonic acid.

As especially preferable examples of the sulfonic acid type unsaturated carboxylic acid polymer, there can be mentioned copolymers prepared by copolymerization of at least one kind of unsaturated carboxylic acid selected from acrylic acid, methacrylic acid, maleic acid and itaconic acid with at least one kind of monomer selected from vinylsulfonic acid, 3-sulfopropyl acrylate, 3-sulfopropyl methacrylate, 3-sulfo-2-hydroxypropyl acrylate and 3-sulfo-2-hydroxypropyl methacrylate. These copolymers preferably contain at least 2% by mol of units derived from an unsaturated carboxylic acid.

The polymer having a functional group capable of reacting with a carboxylic acid for partially crosslinking the unsaturated carboxylic acid polymer preferably has at least one kind of functional group selected from a hydroxyl group, a glycidyl group and an amino group as the functional group capable of reacting with a carboxylic acid. As specific examples of the polymer having a hydroxyl group, there can be mentioned polyvinyl alcohol, dextran, alkyl cellulose, agarose, pullulan, inulin, chitosan, poly-2-hydroxypropyl acrylate, poly-2-hydroxypropyl methacrylate, glycerol monoacrylate and glycerol monomethacrylate. Of these polyvinyl alcohol and the above-recited polysaccharides are preferable. As specific examples of the polymer having a glycidyl group, there can be mentioned glycidyl group-containing polymers such as polyglycidyl acrylate, polyglycidyl methacrylate, sorbitol polygycidyl ether and phenolic epoxy resins. As specific examples of the polymer having an amino group, there can be mentioned polyallylamine, polyethyleneimine, poly-3-aminopropyl acrylate, poly-3-aminopropyl methacrylate, poly-3-aminopropyl acrylamide, poly-3-aminopropyl methacrylamide and chitosan. Of these, polyethyleneimine is preferable. Among the above-recited polymers, the polymer having a hydroxyl group is especially preferable In view of ease in handling property.

The amount of the polymer having a functional group capable of reacting with a carboxylic acid for partially crosslinking the unsaturated carboxylic acid polymer is preferably in the range of 0.05 to 0.2 part by weight based on one part by weight of the unsaturated carboxylic acid polymer. Thus, by the phrase "partially crosslinked with a polymer having a functional group capable of reacting with a carboxylic acid" as used herein, we mean that the unsaturated carboxylic acid polymer is crosslinked to a degree corresponding to that obtained by addition of such amount of the polymer having a functional group capable of reacting with a carboxylic acid.

The cation exchanger of the present invention can be easily produced by a process comprising the following steps; a first step of dispersing fine particles in (i) a solution containing a combination of at least one unsaturated carboxylic acid polymer with a polymer having a functional group capable of reacting with a carboxylic acid, or (ii) a solution containing at least one acrylic acid-maleic acid copolymer, to prepare a dispersion of fine particles; a second step of removing a liquid medium from the dispersion of fine particles to separate a solid content; and a third step of heating the separated solid content in a dried state to obtain a fine particle having bound to the surface thereof a polymer having a cation exchanging property.

In the case where the unsaturated carboxylic acid polymer is used in combination with the polymer having a functional group capable of reacting with a carboxylic acid, when a liquid medium is removed from the dispersion of fine particles to separate the solid content at the second step, the separated solid content is fine particles having a surface layer comprised of a mixture of the two polymers. When the separated solid content is heated in a dried state at the third step, a carboxylic acid group of the unsaturated carboxylic acid polymer and a functional group capable of reacting with a carboxylic acid group are allowed to react with each other whereby the unsaturated carboxylic acid polymer is partially crosslinked.

In the case where the acrylic acid-maleic acid copolymer is used, when the separated solid content is heated in a dried state at the third step, fine particles having a surface layer comprised of the acrylic acid-maleic acid copolymer are obtained. The acrylic acid-maleic acid copolymer in the surface layer is usually bound to the fine particles through a single bond. By the binding through a single bond, the acrylic acid-maleic acid copolymer is firmly retained on the fine particles.

As the liquid medium in which the fine particles are dispersed, solvents which have a low boiling point and are capable of being easily removed, such as water and lower alcohols, are preferably used. The removal of the liquid medium is preferably carried out by vacuuming, for example, by using an evaporator and subjecting the dispersion of fine particles to vacuum distillation at a temperature of, for example, 80° C. to 90° C. so that the fine particles are covered by a uniform surface layer comprised of polymer. After the removal of liquid medium by distillation, the fine particles are heated to effect crosslinking of polymer. More specifically the fine particles are heated in a dried state preferably at a temperature of at least 160° C. but not higher than 200° C. If desired, the heat-treated fine particles are purified by washing with an aqueous alkali solution and water to give fine particles having a cured surface layer comprised of crosslinked polymer having a cation exchanging property.

The cation exchanger of the present invention is useful as a packing for chromatography. More specifically the anion extender is packed in a column made of glass or a metal, and the packed column is used in chromatography for analyzing, separating or isolating anionic protein or other materials. Especially when the packed column is used for liquid chromatography, an enhanced capacity for adsorption of a sample to be analyzed, separated or isolated and improved liquid passage characteristics are obtained.

The invention will now be described by the following working examples that by no means limit the scope of the invention.

EXAMPLE 1

(Production of Cation Exchanger)

A two-liter Kjeldahl flask was charged with the following ingredients.

3-Sulfopropyl methacrylate 125 g

Acrylic acid 12 g

Polymerization initiator (tradename "V-65" available from Wako Pure Chem. Ind. Ltd.) 1.2 g Methanol 1,200 g Distilled water 180 g A cooling pipe and a nitrogen-blowing pipe were fitted to the flask, and then the flask was dipped in an oil bath maintained at 60° C. to conduct a polymerization under nitrogen stream for 6 hours. Thus-obtained polymer precipitate was subjected to decantation to remove the solvent, and then methanol was added and decantation was carried out whereby the polymer was purified. The purified polymer was dried in a vacuum to give a white polymer (hereinafter referred to as "example 1 polymer").

Example 1 polymer had a weight average molecular weight (Mw) of 186,000 as measured by liquid chromatography employing the following equipment and conditions. The ratio of Mw/Mn (number average molecular weight) was 3.5.

Pump: trade name "CCPM-II" available from Tosoh Corporation

Auto-sampler: trade name "AS-8020" available from Tosoh Corporation)

Columns: trade name "G5000 PWXL" and "G3000 PWXL", both available from Tosoh Corporation; arranged in series in this order Detector: trade name "RI-8022" available from Tosoh Corporation Eluting solution: 0.1 M phosphoric acid buffer (pH: 6.8)

Flow rate: 0.8 ml/min

Data-processing apparatus: trade name "SC-8020" available from Tosoh Corporation A two-liter Kjeldahl flask was charged with 50 g of example 1 polymer, 5 g of dextran (available from Sigma Co., molecular weight: 20,000) and 1 liter of distilled water to prepare an aqueous polymer solution. 500 g of porous hydrophilic acrylate polymer particles having an average particle diameter of 7 μm and having pores with an average diameter of 1,000 Å on the surface thereof were added to prepare an aqueous dispersion of fine particles. The flask was set to an evaporator and dipped in an oil bath maintained at 90° C. for 3 hours to distill off the solvent. The thus-obtained cation exchanger was placed in a square vat and the vat was heated for 3 hours in a warm air-circulating heater maintained at 180° C. After the heating, the vat was cooled, and the obtained cation exchanger was dispersed in pure water and then washed by using a glass filter. The porous hydrophilic acrylate polymer particles used were prepared by taking them from a commercially available column (trade name "TSK gel G5000 PWXL" available from Tosoh Corporation), followed by classification.

(Evaluation of Cation Exchanger's Performance for Adsorptive Separation of Protein)

The cation exchanger was packed in a column having a size of 4.6 mm I.D.×5 mm L. The adsorption capacity for protein was measured by a break-through method. The measuring conditions and equipment employed were as follows.

Pump: trade name "CCPM-II" available from Tosoh Corporation

Auto-sampler: trade name "AS-8020" available from Tosoh Corporation

Detector: trade name "UV-8020" available from Tosoh Corporation

Sample: 10 mg/ml, "Lysozyme" available from Sigma Co.

Amount of sample injected: 5 ml

Measurement wavelength: UV 251 nm

Eluting solution: 20 mM sodium-phosphoric acid buffer (pH: 7.0)

The adsorption capacity for protein (Lysozyme) was 98 mg Lysozyme/ml•gel as calculated taking the 10% height of extinction change due to protein elution as the break point.

The above-mentioned cation exchanger was packed in a column having a size of 5.0 mm I.D.×50 mm L. Separation of protein was conducted under the following conditions. The equipment used was the same as mentioned above.

Eluting solution: A: 20 mM sodium-phosphoric acid buffer (pH: 7.0)

B: eluting solution A+0.5M aqueous sodium chloride

Gradient: linear gradient transferring from 100% eluting solution A to 100% eluting solution B over a period of 20 minutes Flow rate: 1.0 ml/min.

Sample: RNase (30 mg/ml, available from Sigma Co.)

Alpha-chymotrypsinogen A (5 mg/ml, available from Sigma Co.)

Cytochrome C (5 mg/ml, available from Sigma Co.)

Lysozyme (5 mg/ml, available from Pharmacia Co. )

Amount of sample injected: 10 μl

Measurement wavelengths UV 280 nm

Figure 1:
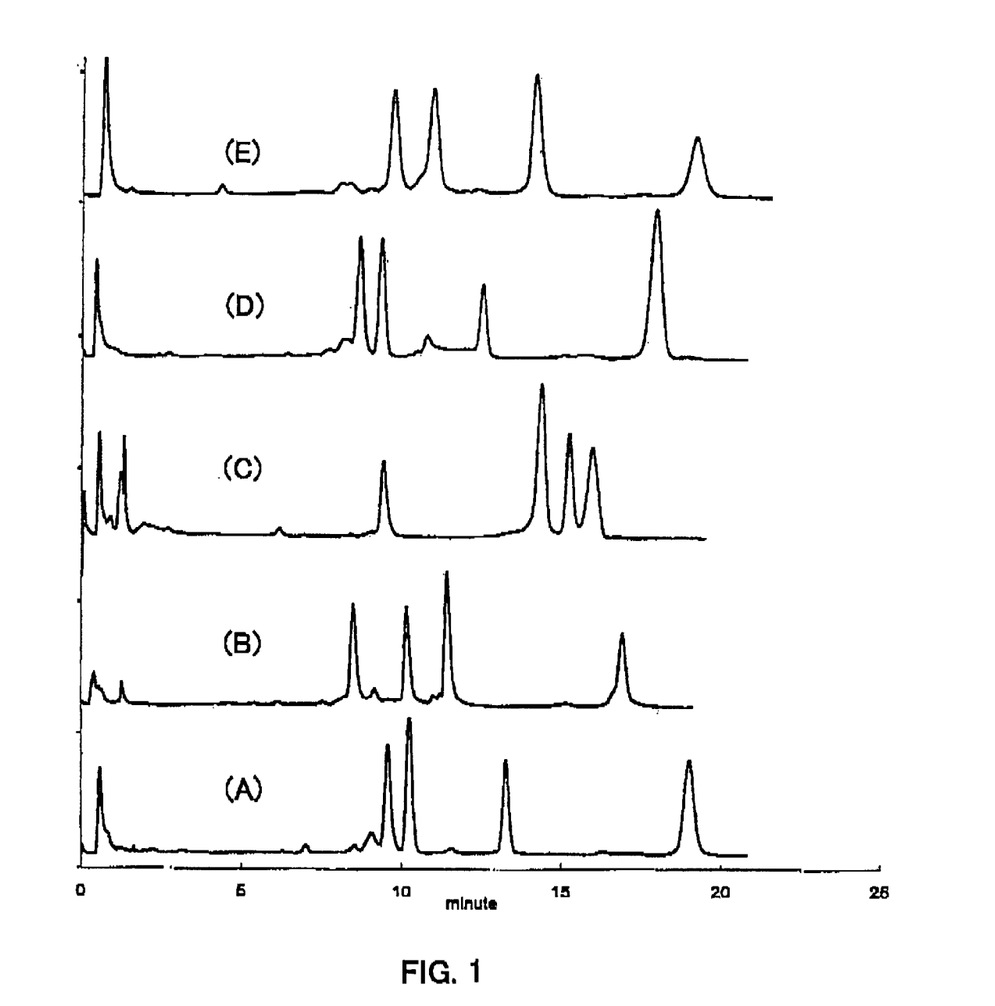
FIG. 1 illustrates chromatograms (A), (B), (c) and (D) as obtained for separating protein by using cation exchangers of the present invention in Examples 1, 2, 4 and 5, respectively, and chromatogram (E) as obtained for separating protein by using a comparative cation exchanger in Comparative Example 2.

The test results are shown in chromatogram (A) in FIG. 1. The abscissa shows the time (in minutes) elapsing from the injection of a sample into a measuring apparatus. As seen from chromatogram (A), the cation exchanger made in Example 1 had a large adsorption capacity for protein and a high separation performance. The operation pressure in the flow paths was 1.2 MPa, and thus, the cation exchanger had good liquid passage characteristics. That is, a large adsorption capacity and high separation performance can be obtained at a low operation pressure.

EXAMPLE 2

A cation exchanger was prepared from example 1 polymer and its adsorption capacity for protein was evaluated by the same procedures as described in Example 1, wherein silica fine particles having an average particle diameter of 4 μm taken from a commercially available column (trade name "TSK gel Super SW3000" available from Tosoh Corporation) were used instead of the hydrophilic porous acrylate polymer particles. All other conditions remained the same.

The cation exchanger exhibited an adsorption capacity for protein (Lysozyme) of 110 mg/ml•gel.

The results of testing the separation of protein using the cation exchanger are shown in chromatogram (B) in FIG. 1. As seen from chromatogram (B), the cation exchanger made in Example 2 had a large adsorption capacity for protein and a high separation performance. The operation pressure in the flow paths was 4.0 MPa.

EXAMPLE 3

A cation exchanger was prepared from example 1 polymer by the same procedures as described in Example 1, wherein silica fine particles having an average particle diameter of 4 μm taken from a commercially available column (trade name "TSK gel Super SW2000" available from Tosoh Corporation) were used instead of the hydrophilic porous acrylate polymer particles. All other conditions remained the same.

The cation exchanger was packed in a column having a size of 5.0 mm I.D.×50 mm L. Separation of peptide was conducted under the following conditions. The equipment used was the same as that used for separation of protein in Example 1.

Eluting solution: A: 20 mM sodium-acetic acid buffer (pH: 5.0)

B: eluting solution A+0.5M aqueous sodium chloride

Gradient: linear gradient transferring from 100% eluting solution A to 100% eluting solution B over a period of 20 minutes Flow rate: 1.0 ml/min.

Sample: Angiotensin I, II and III, and variants (available from Peptide Kenkyusho K.K.)

Amount of sample injected: 10 μl

Measurement wavelength: UV 280 nm

Figure 2:
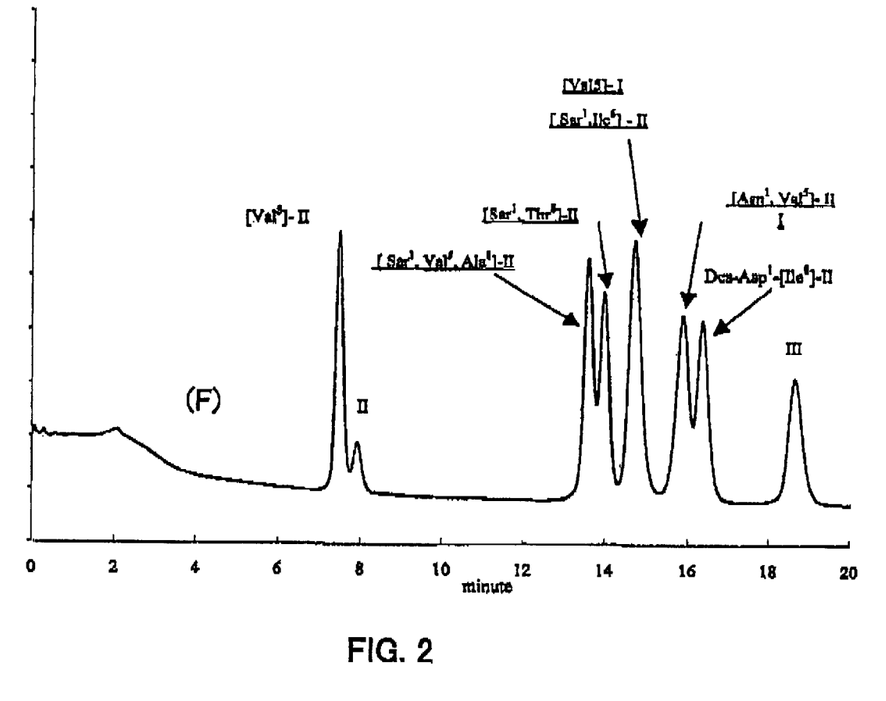
FIG. 2 illustrates chromatograms (F) as obtained for separating peptide by using a cation exchanger of the present invention in Example 3.

The test results are shown in chromatogram (F) in FIG. 2. The abscissa shows the time (in minutes) elapsing from the injection of a sample into a measuring apparatus. Meanings of the symbols in FIG. 2 are as follows.

I: Angiotensin I
II: Angiotensin II
III: Angiotensin III
($Val^5$)-II, ($Sar^1$, $Val^5$, $Ala^8$)-II, ($Sar^1$, $Thr^8$)-II, ($Sar^1$, $Ile^6$)-II, ($Asn^1$, $Val^5$)-II and Des-$Asp^1$-($Ile^8$)-II: Variants of angiotensin II ($Val^5$)-I: Variant of angiotensin I As seen from chromatogram (F), the cation exchanger made in Example 3 exhibited a high separation performance for peptide and good adsorption peaks. Thus, for the separation of peptide, the cation exchanger of the invention has a high separation performance. Further, the operation pressure in the flow paths was 4.0 MPa, and thus, the cation exchanger has good liquid passage characteristics. That is, a large adsorption capacity and high separation performance can be obtained at a low operation pressure.

EXAMPLE 4

A cation exchanger was prepared by the same procedures as described in Example 1, wherein 100 g of an acrylic acid-maleic acid copolymer (available from Aldrich Co.; molecular weight 70,000) was used instead of 50 g of example 1 polymer, and the amount of dextran was changed to 10 g with all other conditions remaining the same.

The cation exchanger exhibited an adsorption capacity for protein of 92 mg/ml•gel as measured by the same procedures as in Example 1.

Separation of protein was conducted by the same procedures as in Example 1. The results of the protein separation test using the cation exchanger are shown in chromatogram (C) in FIG. 1. As seen from chromatogram (C), the cation exchanger made in Example 4 had a high separation performance, which was similar to that in Example 1. The operation pressure in the flow paths was 1.5 MPa.

EXAMPLE 5

A cation exchanger was prepared by the same procedures as described in Example 1, wherein 2 g of polyethyleneimine having an average molecular weight of 10,000 was used instead of 5 g of dextran with all other conditions remaining the same.

The cation exchanger exhibited an adsorption capacity for protein of 94 mg/ml•gel as measured by the same procedures as in Example 1.

Separation of protein was conducted by the same procedures as in Example 1. The results of the protein separation test using the cation exchanger are shown in chromatogram (D) in FIG. 1. As seen from chromatogram (D), the cation exchanger made in Example 5 had a high separation performance, which was similar to that in Example 1. The operation pressure in the flow paths was 2.0 MPa.

EXAMPLE 6

A cation exchanger was prepared by the same procedures as described in Example 1, wherein 100 g of an acrylic acid-maleic acid copolymer having an average molecular weight of 50,000 was used instead of 50 g of example 1 polymer, and dextran was not used with all other conditions remaining the same.

The thus-obtained cation exchanger was packed in a column having a size of 4.6 mm I.D.×5 mm L. The adsorption capacity for protein was measured by a break-through method. The measuring conditions and equipment employed were as follows.

Pump: trade name "CCPM-II" available from Tosoh Corporation

Auto-sampler: trade name "AS-8020" available from Tosoh Corporation

Detector: trade name "UV-8020" available from Tosoh Corporation, wavelength: 251 nm Sample: 10 mg/ml, "Lysozyme" available from Pharmacia Co.

Amount of sample injected 2 ml

Measurement wavelength: UV 280 nm

Eluting solution: 20 mM sodium-phosphoric acid buffer (pH: 7.0)

The adsorption capacity for protein (Lysozyme) was 98 mg Lysozyme/ml•gel as calculated taking the 10% height of extinction change due to protein elution as the break point.

Separation of protein was conducted by the same procedures as in Example 1. The results of the protein separation test using the cation exchanger are shown In chromatogram (G) in FIG. 3. The abscissa shows the time (in minutes) elapsing from the injection of a sample into a measuring apparatus.

Figure 3:
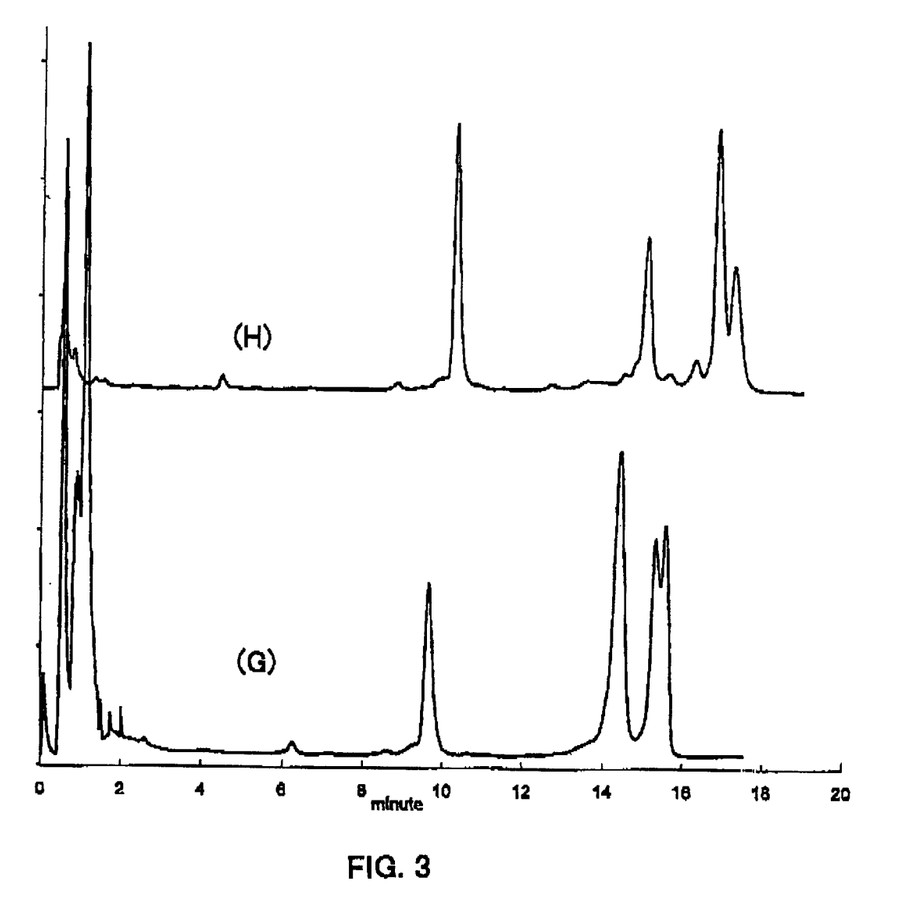
FIG. 3 illustrates chromatograms (G) and (H) as obtained for separating protein by using cation exchangers of the present invention in Examples 6 and 7, respectively.

As seen from chromatogram (G), the cation exchanger made in Example 6 had an enhanced capacity for adsorption of protein and a high separation performance. Further, the operation pressure in the flow paths was 1.7 MPa, and thus, the cation exchanger has good liquid passage characteristics. That is, a large adsorption capacity and high separation performance can be obtained at a low operation pressure.

EXAMPLE 7

A cation exchanger was prepared by the same procedures as described in Example 6, wherein silica fine particles having an average particle diameter of 4 μm taken from a commercially available column (trade name "TSK gel Super SW3000WXL" available from Tosoh Corporation) were used with all other conditions remaining the same.

The cation exchanger exhibited an adsorption capacity for protein of 113 mg/ml•gel as measured by the same procedures as in Example 6.

Separation of protein was conducted by the same procedures as in Example 1. The results of the protein separation test using the cation exchanger are shown in chromatogram (H) in FIG. 3. As seen from chromatogram (H), the cation-exchanger made in Example 7 had a high separation performance. The operation pressure in the flow paths was 4.0 MPa.

EXAMPLE 8

A cation exchanger was prepared by the same procedures as described in Example 6, wherein an acrylic acid-maleic acid copolymer having an average molecular weight of 70,000 was used instead of an acrylic acid-maleic acid copolymer having an average molecular weight of 50,000 with all other conditions remaining the same.

The cation exchanger exhibited an adsorption capacity for protein of 102 mg/ml•gel as measured by the same procedures as in Example 6.

EXAMPLE 9

A cation exchanger was prepared by the same procedures as described in Example 6, wherein an acrylic acid-maleic acid copolymer having an average molecular weight of 3,000 was used instead of an acrylic acid-maleic acid copolymer having an average molecular weight of 50,000 with all other conditions remaining the same.

The cation exchanger exhibited an adsorption capacity for protein of 57 mg/ml•gel as measured by the same procedures as in Example 6.

Comparative Example 1

A cation exchanger was prepared by the same procedures as described in Example 1, wherein dextran was not used with all other conditions remaining the same.

The cation exchanger exhibited an adsorption capacity for protein of 120 mg/ml•gel as measured by the same procedures as in Example 1.

Separation of protein was tried by the same procedures as in Example 1 using a column having a size of 5.0 mm I.D.×50 mm L. But, the operation pressure was too high and the packing was broken by the high pressure during operation. Thus, measurement could not be carried out.

Comparative Example 2

A cation exchanger was prepared by the same procedures as described in Example 1, wherein an cation exchanger, made from the same porous hydrophilic acrylate polymer particles without use of example 1 polymer and dextran, was used with all other conditions remaining the same.

The cation exchanger exhibited an adsorption capacity for protein of 41 mg/ml•gel as measured by the same procedures as in Example 1.

Separation of protein was carried out by the same procedures as in Example 1. The results of the protein separation test are shown in chromatogram (E) in FIG. 1. The operation pressure was 1.2 MPa. The porous hydrophilic acrylate polymer particles used in this example was taken from a commercially available column (trade name "TSK gel SP-5PW" available from Tosoh Corporation).

Comparative Example 3

A cation exchanger was prepared by the same procedures as described in Example 6, wherein polyacrylic acid having an average molecular weight of 90,000 was used instead of an acrylic acid-maleic acid copolymer having an average molecular weight of 50,000 with all other conditions remaining the same.

The cation exchanger exhibited an adsorption capacity for protein of 16 mg/ml•gel as measured by the same procedures as in Example 6.

Comparative Example 4

A cation exchanger was prepared by the same procedures as described in Example 6, wherein polyacrylic acid having an average molecular weight of 2,000 was used instead of an acrylic acid-maleic acid copolymer having an average molecular weight of 50,000 with all other conditions remaining the same.

The cation exchanger exhibited an adsorption capacity for protein of 34 mg/ml•gel as measured by the same procedures as in Example 6.

Advantages of the cation exchanger of the present invention are summarized as follows. The cation exchanger exhibits an enhanced capacity for adsorption of protein or other objective sample, although the cation exchanger is comprised of fine particles. Further, when the cation exchanger is used as a packing for liquid chromatography, it exhibits high adsorption capacity, high retention, and high resolution for separation with a low operation pressure.

What is claimed is:

1. A cation exchanger comprised of a fine particle with an average particle diameter in the range of 1 μm to 1,000 μm having bound to the surface thereof a polymer having a cation exchanging property; said polymer having a cation exchanging property being at least one copolymer prepared by copolymerization of at least one kind of unsaturated carboxylic acid selected from the group consisting of acrylic acid, methacrylic acid, maleic acid and itaconic acid with at least one kind of monomer selected from the group consisting of vinylsulfonic acid, 3-sulfopropyl acrylate, 3-sulfopropyl methacrylate, 3-sulfo-2-hydroxypropyl acrylate and 3-sulfo-2-hydroxypropyl methacrylate and partially crosslinked with a polymer having at least one kind of functional group selected from the group consisting of a hydroxyl group, a glycidyl group and an amino group.

2. The cation exchanger according to claim 1, wherein the polymer having a hydroxyl group is selected from the group consisting of polyvinyl alcohol and polysaccharides.

3. The cation exchanger according to claim 1, wherein the polymer having an amino group is polyethyleneimine.

4. A process for producing the cation exchanger as claimed in claim 1, which comprises the steps of:

dispersing fine particles with an average particle diameter in the range of 1 μm to 1,000 μm in a solution containing a combination of at least one copolymer prepared by copolymerization of at least one kind of unsaturated carboxylic acid selected from the group consisting of acrylic acid, methacrylic acid, maleic acid and itaconic acid with at least one kind of monomer selected from the group consisting of vinylsulfonic acid, 3-sulfopropyl acrylate, 3-sulfopropyl methacrylate, 3-sulfo-2-hydroxypropyl acrylate and 3-sulfo-2-hydroxypropyl methacrylate, with a polymer having at least one kind of functional group selected from the group consisting of a hydroxyl group, a glycidyl group and an amino group to prepare a dispersion of the fine particles;

removing a liquid medium from the dispersion of fine particles to separate a solid content; and then heating the separated solid content in a dried state to obtain a fine particle having bound to the surface thereof a polymer having a cation exchanging property.

5. The production process according to claim 4, wherein the fine particles have at least one kind of functional group selected from the group consisting of a hydroxyl group, a glycidyl group and an amino group.

6. A packing for chromatography, which is comprised of the cation exchanger as claimed in claim 1.

7. A column for chromatography packed with the packing as claimed in claim 6.

\* \* \* \* \*